United States Patent [19]

Hoh et al.

[11] 4,346,196

[45] Aug. 24, 1982

[54] HEAT SEAL COMPOSITION COMPRISING A BLEND OF METAL NEUTRALIZED POLYMERS

[75] Inventors: George L. Hoh; Donald A. Vassallo, both of Wilmington, Del.

[73] Assignee: E. I. Du Pont de Nemours and Company, Wilmington, Del.

[21] Appl. No.: 185,728

[22] Filed: Sep. 10, 1980

[51] Int. Cl.³ .................. C08L 23/26; C08L 31/04; C08L 33/02; C08L 33/06
[52] U.S. Cl. .................. 525/196; 525/221; 428/500; 428/515; 428/516
[58] Field of Search .................. 525/196, 221

[56] References Cited

U.S. PATENT DOCUMENTS

| | | | |
|---|---|---|---|
| 3,201,374 | 8/1965 | Simms | 260/80.5 |
| 3,215,678 | 11/1965 | Adelman | 260/80.5 |
| 3,249,570 | 5/1966 | Potts et al. | 260/29.6 |
| 3,264,272 | 8/1966 | Rees | 260/78.5 |
| 3,355,319 | 11/1967 | Rees | 117/122 |
| 3,496,061 | 2/1970 | Freshour et al. | 161/254 |
| 3,552,638 | 1/1971 | Quackenbush | 229/66 |
| 3,616,898 | 11/1971 | Massie | 206/56 AA |
| 3,707,393 | 12/1972 | McDonald | 117/76 P |
| 3,789,035 | 1/1974 | Iwami et al. | 260/78.5 |
| 3,791,915 | 2/1974 | Goehring et al. | 161/227 |
| 3,970,626 | 7/1976 | Hurst et al. | 260/29.6 |
| 4,188,441 | 2/1980 | Cook | 428/216 |
| 4,189,519 | 2/1980 | Ticknor | 428/476 |

*Primary Examiner*—Carman J. Seccuro

[57] ABSTRACT

Heat seal compositions and articles including the compositions are disclosed. The compositions exhibit a broad temperature range for making heat seals of variable strengths and are useful as the sole heat seal composition in making flexible packages requiring both permanent and peelable seals.

5 Claims, No Drawings

HEAT SEAL COMPOSITION COMPRISING A BLEND OF METAL NEUTRALIZED POLYMERS

BACKGROUND OF THE INVENTION

1. Field of the Invention

In the manufacture of flexible film packages by means of heat seal methods, there has long been a need for heat seal compositions exhibiting a broad enough heat sealing temperature range that both permanent and peelable seals can be made reproducibly in the same packages with a variety of film materials. The permanent seals in such packages are preferably so strong that seal failure will occur by tearing the packaging film; and the peelable seals are preferably strong enough to hold contents of the package but weak enough to permit separation of the package walls with a moderate force. Rupture of the peelable seals is preferably a cohesive failure in the heat seal composition itself; and the rupture is preferably clean without a loose debris of the heat seal composition. A broad temperature range between formation of the peelable seals and the permanent seals is important because, with a broad temperature range, a single heat sealing device can be used to make peelable and permanent seals without need for highly sensitive thermostatic controls to be built into the device.

2. Description of the Prior Art

U.S. Pat. No. 4,188,441, issued Feb. 12, 1980, discloses a blend of polymers useful with high density polyethylene film to make peelable heat seals. The blend of that patent is disclosed to be of an ethylene vinyl acetate or acrylic ester two-component copolymer and a sodium-neutralized ionomer. The disclosed object is to make peelable seals only and permanent seals are avoided as undesirable.

U.S. Pat. No. 3,707,393 isued Dec. 26, 1972 on the application of McDonald discloses heat seal use of a combination of an ionomer and, in a special instance, a terpolymer. The combination of materials is merely a physical mixture and not a blend with partial neutralization of both polymers.

U.S. Pat. No. 3,789,035 issued Jan. 29, 1974 on the application of Iwami et al. discloses a process wherein carboxylic acid groups in one polymeric material can be neutralized by reaction contact with neutralized carboxylic acid groups in another polymeric material. The patent also discloses separation of the polymers so neutralized.

U.S. Pat. No. 3,496,061 issued Feb. 17, 1970 on the application of Freshour et al. discloses heat sealed packages made using at least two different materials so that at least one seal will exhibit a peel strength of more than 400 grams per inch.

U.S. Pat. No. 4,189,519 issued Feb. 19, 1980 on the application of Ticknor discloses a blend of polymeric materials which serves as a heat seal composition wherein one required compound is an isotactic polybutylene.

SUMMARY OF THE INVENTION

The present invention embraces a heat seal composition which exhibits a broad effective temperature range to achieve heat seals of controlled strength on a variety of substrate materials. The composition is a blend of a terpolymer with a partially-neutralized ionomer including about 20–80 weight parts of the terpolymer and 20–80 weight parts of the ionomer. Both polymers contain, as a monomeric component, an unsaturated monocarboxylic acid. The total carboxylic acid in the blend is neutralized 5–40 percent.

The heat seal composition of this invention exhibits a broad temperature range for making heat seals of variable strengths. The composition of this invention permits the manufacture of film, foil or paper packages with permanent side or bottom seals and peelable top seals.

DESCRIPTION OF THE INVENTION

Heat seal compositions have long been used to make packages from films, foils and paper. The packaging material substrate is usually coated on one side with the heat seal composition, coated sides are then mated face-to-face, and mated materials are heated at intended seam areas to melt the heat seal composition and yield package seams.

According to this invention there is provided, as a heat seal composition, a substantially homogeneous blend of polymeric materials comprising: a terpolymer having ethylene, vinyl alkanoate or unsaturated alkyl ester, and a partially-neutralized, unsaturated, carboxylic acid as monomeric components; and an ionomer having ethylene and a partially-neutralized, unsaturated, carboxylic acid as monomeric components.

The terpolymer has about 65 to 95 percent, by weight, ethylene, about 4 to 30 percent, by weight, vinyl alkanoate or unsaturated alkyl ester, and about 0.5 to 20 percent, by weight, unsaturated carboxylic acid. The vinyl alkanoate or unsaturated alkyl ester monomeric component is present in the terpolymer to provide a component for increasing adhesion to film, foil, and paper substrates and to provide increased flexibility to the composition and to broaden the effective heat sealing temperature range. The unsaturated alkyl esters include alkyl acrylate and alkyl methacrylate wherein the alkyl group has one to four carbon atoms. Examples include methyl acrylate, ethyl acrylate, methyl methacrylate, ethyl methacrylate, isobutyl acrylate, and the like. The vinyl alkanoates include vinyl acetate, vinyl propionate, vinyl butyrate and the like wherein the alkanoic acid moiety of the alkanoate has one to four carbon atoms. Vinyl acetate, 10 to 30 percent, by weight, is preferred for paper and foil substrates and isobutyl acrylate, 5 to 25 percent, by weight, is preferred for polymeric film substrates. A terpolymer with too little vinyl alkanoate or unsaturated ester component exhibits generally poor adhesion and narrow heat sealing temperature range while an excess of that component causes excessive tackiness of the heat seal composition.

The terpolymer can have more than three monomeric components so long as the additional components do not interfere with the function of those three components which are necessary for operation of this invention.

The carboxylic acid monomeric component is present in the terpolymer to provide a component similar to the acid component in the ionomer. It is believed that, by the presence of carboxylic acid components in each of the blend polymers, a cooperation is realized between the polymers. Although the mechanism is not entirely understood, it is believed that the presence of carboxylic acid components in each of the blend polymers causes a degree of compatibility between the polymers which is evidenced: first, by a broadening of the temperature range within which peelable heat seals can be made; and, second, by a substantial increase in the maximum heat seal strength which could be obtained by blends of similar materials but without the mutual carboxylic acid component.

The eligible carboxylic acids include acrylic acid and methacrylic acid. Those components can be used in amounts of 0.5 to 20 percent, by weight of the terpolymer composition, and 0.8 to 15 percent, by weight, of either acid is preferred. At acid contents which are too low, the compatibilizing effects described above are lost and at acid contents which are too high, the terpolymer exhibits an undesirably high modulus.

Terpolymers which include the carboxylic acid component and which are eligible for use in practice of this invention are described in U.S. Pat. No. 3,264,272.

The ionomer has about 75 to 99 percent, by weight, ethylene, and about 1 to 25 percent, by weight, unsaturated carboxylic acid. For use in this invention, it is preferred that the ionomer should have 3 to 20 percent, by weight, unsaturated carboxylic acid. From about 5 to about 75 percent of the carboxylic acid groups in the ionomer should be neutralized by zinc metal ions.

Ionomers which are eligible for use in practice of this invention are described in U.S. Pat. No. 3,355,319.

As was stated, the combination of vinyl alkanoate or alkyl acrylate or methacrylate with acrylic or methacrylic acid in the terpolymer and acrylic or methacrylic acid in the ionomer results in a balance of improved adhesion, improved polymer compatibility, and broadened heat seal temperature range. To obtain the full benefit of that balance, it has been found necessary to provide terpolymer material wherein the combined weight percentage of vinyl alkanoate or unsaturated alkyl ester with acrylic or methacrylic acid components is at least eight percentage points greater than the weight percentage of unsaturated acid in the ionomer. Because these benefits relate, in large part, to alteration of the softening or melting temperature of the blend, it is believed that the component ratio requirements are substantially independent of the amount of terpolymer and ionomer used within the overall requirement that not less than 20 nor more than 80 weight percent of each material must be present in the blend.

The various components of the heat seal composition are combined to form a molecular mixture of materials. The combination can be made by any of the common methods for blending materials. For example, solutions of the materials can be mixed and the solvent subsequently removed; the materials can be mixed together in melt form such as by melt blending in an extruder; or the materials can be milled together such as on a two-roll mill or a Banbury blender. The major requirements of the blending are that the resultant blend must be substantially homogeneous and that the blending must cause mixing of the materials which is intimate enough to permit an equalizing of the neutralization between the carboxylic acid groups of the terpolymer and the ionomer. Extrusion blending has been found adequate and is preferred for making the blends of this invention.

It is understood that, in the blends, the terpolymer contains carboxylic acid groups which are partially neutralized; and that the terpolymer could, therefore, be identified as an ionomer. In fact, the blends of this invention can, also, be prepared from two ionomers or from a three-component ionomer and an unneutralized copolymer, or if desired, from appropriate combinations of such components. Additionally, the blends can be prepared by melt blending unneutralized copolymer and terpolymer and then neutralizing the blended mixture. Suitable processes for conducting such a neutralization are disclosed in U.S. Pat. Nos. 3,404,134 and 3,969,434. Insofar as the carboxylic acid groups are concerned, it is only necessary that the finished blend must include carboxylic acid groups in each polymer component neutralized to the required extent.

It has been found that the benefits of this invention are obtained when the degree of neutralization of all carboxylic acid groups in the blend is from 5 to 40 percent. Terpolymer and ionomer materials are selected such that, when the degree of neutralization of the unblended, neutralized, material is averaged with the unneutralized material during blending, the resulting, overall, neutralization will be in the necessary range.

The heat seal composition of this invention can be used in the ways that heat seal compositions are usually used. It can be used as a self-supporting structure such as in the form of sheets, strips or webs; it can be coated onto a substrate packaging material as a solution or emulsion; it can be coextruded with a substrate packaging film material; and it can be laminated to a substrate material using an adhesive.

The heat seal composition of this invention can be used with a variety of substrate packaging materials. As earlier described, monomeric components of the terpolymer and the ionomer can be especially selected to increase adhesion of the heat seal composition to the substrate packaging material. Additionally, when high density polyethylene, polypropylene, polyesters, polyamides, or the like, are to be used as the substrate packaging material, it has been found important to use a metal ion having a valence greater than one to neutralize the carboxylic acid groups of the heat seal composition. Zinc is the metal ion preferred and most usually used in such cases because zinc has been found to provide the required broad heat sealing temperature range.

In making peelable heat seals for flexible packages, it is usually desirable and often required that ruptures of the seals should occur within the heat seal composition. It is, therefore, important that the heat seal composition should be more strongly adhered to the substrate material than the heat seal composition layers adhere to themselves when a peelable heat seal is made. When permanent or fused heat seals are made, it is desirable that the heat seal composition should be fused together and that it should be so strongly adhered to the substrate material that tearing of the substrate material occurs before rupture of the heat seal and that, in any event, the seal does not rupture by separation of the fused heat seal composition. Use of zinc as a neutralizing metal ion and use of appropriate vinyl alkanoate or unsaturated ester in the terpolymer, particularly vinyl acetate or isobutyl acrylate, are believed to be important in obtaining a maximum fused heat seal strength with a variety of substrate packaging materials.

One important feature of the heat seal composition of this invention is the broad heat sealing temperature range extending from that temperature necessary to achieve a low strength, peelable, heat seal to that temperature required for a maximum-strength, permanent, heat seal wherein the heat seal composition from mated materials has completely fused together.

The broad temperature range for heat seals made using the heat seal compositions of this invention can be evidenced by a standardized heat sealing test in which self-supported films of the heat seal composition are prepared and then a series of heat seals are made with those films at a series of temperatures. The heat seals so made are tested as to peel strength and the temperatures are noted which result in peel strengths of 118 grams per centimeter (300 grams per inch), 275 grams per centimeter (700 grams per inch), and tear seal. A tear seal represents the maximum seal which can be obtained with a given substrate material because that seal strength actually represents the tear strength of the substrate material or the cohesive strength of the fused heat seal composition. When performing peel strength tests using films of the heat seal composition, the tear seal occurs at the temperature where the composition is fully fused. In determining temperatures at which heat seals have been made, it is important to determine the temperatures at the interface between the heat seal composition layers rather than heat seal jaw or bar temperatures. Due to calibration errors in heat sealing devices or variations in heat transfer, sealing jaw temperatures can be higher or lower than the actual interfacial temperature by unpredictable amounts.

For purposes of this invention, it has been determined that a temperature range of at least 7, and preferably more than 8, Celsius degrees is acceptable for the peel seal zone (118 to 275 grams per centimeter). It has been found desirable although not necessary, to have a temperature range of at least 8 and preferably more than 10 Celsius degrees for the tear zone (275 grams per centimeter to tear).

Conventional additives, such as fillers, dyes, antioxidants, antistick agents, and the like, can be added to the heat seal compositions of this invention;—the only requirement being that the presence of the additive does not adversely affect the performance of the composition. Antiblocking additives such as silica and slip agents such as substituted fatty amides are examples of additives which can be added in usual amounts. Additives are conveniently and customarily added to the heat seal compositions during blending and are not usually present in amounts exceeding five weight percent of the total composition.

DESCRIPTION OF THE PREFERRED EMBODIMENTS

In examples of the invention which follow, component materials of heat seal compositions were blended together by first mixing the materials in particulate form in the amounts indicated in the Table below; and then melt blending and devolatilizing the mixture in an extruder such as a 28 millimeter Werner & Pfleiderer twin-screw extruder. The extruded blend was pelletized and, to make film for testing, the pellets were converted into blown film in a 1.9 cm (0.75 inch) Brabender extruder fitted with a 2.5 cm (1.0 inch) die. The film was generally of a 0.05 mm (2 mil) thickness with a 2.5 blow-up ratio and was cast at a melt temperature of 190°–210° C.

The film was cut into 2.5 cm (1 inch) wide samples for testing; and pairs of the samples were heat sealed together to provide a 2.5 cm (1 inch) peel length. The seals were made on a device having two heated jaws 2.5 cm (1 inch) wide and the heat seals were made at a clamping pressure of about 275 kPascals (40 psi) for about 3 seconds. The interfacial sealing temperatures were determined by locating the thermocouple between film samples being sealed and calibrating the sealing device therefrom for those samples.

Peel strengths were determined by pulling sealed samples at 23 degrees Celsius and 50% relative humidity in a tensile testing device at the rate of 12.7 cm/min (5 inches/min). Peel strengths were evaluated as a function of the interfacial sealing temperature and the peel seal zone and the tear seal zone were determined therefrom. Those determinations are recorded in the Table below.

TABLE

| Example | Terpolymer Wt % in blend | Composition | % neut. |
|---|---|---|---|
| 1 | 50 | E/10 IBA/10 MAA | 0 |
| 2[1] | 23 | E/28 VA/1 MAA | 0 |
| 3[2] | 30 | E/10 IBA/10 MAA | 0 |
| 4[3] | 28 | " | 0 |
| 5[1] | 23 | " | 0 |
|  | 33 |  | 73 |
| 6[3] | 33 | " | 0 |
|  | 32 |  | 73 |
| 7[1] | 29 | " | 0 |
| 8[2] | 30 | " | 0 |
| 9[2] | 22 | " | 0 |
|  | 32 |  | 73 |
| 10[2] | 32 | " | 73 |
|  | 32 |  | 0 |
|  | 15 |  | 73 |
| 11 | 15 | " | 0 |
| 12[1] | 18 | E/28 VA/1 MAA | 0 |
| 13 | 30 | E/10 IBA/10 MAA | 73 |
|  | 35 |  | 73 |
| 14 | 35 | " | 0 |
| 15 | 30 | " | 0 |
| 16 | 50 | " | 0 |
| 17 | 70 | " | 0 |
|  | 32 |  | 73 |
| 18[2] | 32 | " | 0 |
| A | 0 |  |  |
| B | 0 |  |  |
| C | 50 | E/10 IBA/10 MAA | 0 |
| D | 75 | " | 0 |
| E | 30 | " | 73 |
| F | 70 | " | 73 |
| G | 70 | " | 73 |
| H | 70 | " | 73 |
| I[4] | 50 | " | 0 |
| J[4] | 50 | " | 36/Na |
| K | 70 | " | 73 |

| Example | Ionomer wt. % in blend | composition | % neut. |
|---|---|---|---|
| 1 | 50 | E/9 MAA | 18 |
| 2[1] | 75 | " | 18 |
| 3[2] | 69 | " | 18 |
| 4[3] | 70 | " | 18 |
| 5[1] | 75 | " | 18 |
| 6[3] | 32 | E/4 MAA | 0 |
| 7[1] | 37 | " | 0 |
| 8[2] | 69 | E/9 MAA | 18 |
| 9[2] | 77 | " | 18 |
| 10[2] | 35 | E/4 MAA | 0 |
| 11 | 70 | " | 0 |
|  | 18 | E/4 MAA | 0 |
| 12[1] | 62 | E/9 MAA | 18 |
| 13 | 70 | E/4 MAA | 0 |
| 14 | 30 | " | 0 |
| 15 | 70 | E/9 MAA | 18 |
| 16 | 50 | " | 18 |
| 17 | 30 | " | 18 |
| 18[2] | 35 | E/4 MAA | 0 |
| A | 100 | E/9 MAA | 18 |
| B | 70 | E/9 MAA | 18 |
|  | 30 | E/15 MAA | 20 |
| C | 50 | E/15 MAA | 20 |
| D | 25 | " | 20 |
| E | 70 | E/9 MAA | 18 |
| F | 30 | " | 18 |
| G | 30 | E/4 MAA | 0 |
| H | 30 | " | 0 |
| I[4] | 50 | E/12 MAA | 22/Na |
| J[4] | 50 | " | 0 |

TABLE-continued

| | | | |
|---|---|---|---|
| K | 30 | E/15 MAA | 20 |

| Example | Overall % Neut. | peel seal zone (118–275 g/cm) C° | tear seal zone (275 g/cm - tear) C° |
|---|---|---|---|
| 1 | 8.5 | 7.5 | 17 |
| 2 | 16.0 | 9.5 | 5.5 |
| 3 | 11.8 | 7.5 | 9.5 |
| 4 | 11.6 | 10 | 15 |
| 5 | 12.3 | 8.5 | 15.5 |
| 6 | 29.6 | 7 | 18.5 |
| 7 | 29.6 | 8 | 17.5 |
| 8 | 11.8 | 7.5 | 12.5 |
| 9 | 13.3 | 7.5 | 11 |
| 10 | 29.5 | 6 | 17.5 |
| 11 | 18.9 | 8 | 1 |
| 12 | 13.9 | 7 | 9 |
| 13 | 37.8 | 7 | 2 |
| 14 | 31.2 | 7.5 | 13.5 |
| 15 | 12.2 | 7 | 11 |
| 16 | 8.5 | 10 | 12.5 |
| 17 | 5.0 | 9 | 9.5 |
| 18 | 29.4 | 7 | 16.5 |
| A | 18 | 5 | 11 |
| B | 18.8 | 5 | 7 |
| C | 12.0 | 5.5 | 7 |
| D | 6.7 | 7 | 8 |
| E | 35.7 | 7 | 5.5 |
| F | 57.7 | 6.5 | 6.5 |
| G | 62.3 | 7 | 7.5 |
| H | 62.3 | 6.5 | 13.5 |
| I | 12.0 | 4.5 | 9.5 |
| J | 16.4 | 5 | 11.5 |
| K | 52.3 | 4.5 | 8 |

[1]includes 2 weight percent, in the blend, of one part finely divided silica as an antiblocking agent and two parts of a slip agent.
[2]includes 0.6 weight percent of the additives of note 1, above.
[3]includes 1.2 weight percent of the additives of note 1, above.
[4]Ionomer was neutralized by sodium.

In the examples and the Table, polymeric component materials are identified as follows: E/10 IBA/10 MAA is a terpolymer with ethylene and having 10 weight percent isobutyl acrylate and 10 weight percent methacrylic acid; E/28 VA/1 MAA is a terpolymer with ethylene and having 28 weight percent vinyl acetate and one weight percent methacrylic acid; and E/x MAA is a copolymer with ethylene and a weight percent of methacrylic acid indicated by the number substituted for "x" in the Table.

In the examples of the invention which follow, blends from previous examples were coextruded with high density polyethylene to yield a flexible packaging material of a film of high density polyethylene as a substrate packaging material with a film of one of the blends adhered thereto as a heat seal composition. The coated polyethylene was then tested for heat seal strengths as were films of the blends, previously. Such packaging material of the blend coated onto a substrate material is used to make packages by placing two sheets of the coated material with heat seal layer facing heat seal layer and then producing heat seals by varying or desired strength by applying heat seal jaws of controlled temperature.

| Example | heat seal composition (Example No.) | peel seal zone (C.°) | tear seal zone (C.°) |
|---|---|---|---|
| 19 | 5 | 7 | 13 |
| 20 | 6 | 11.5 | 17.5 |
| 21 | 7 | 9 | 13.5 |
| 22 | 8 | 5.5 | 3.5 |
| 23 | 9 | 6.5 | 10.5 |
| 24 | 10 | 9.5 | 15.5 |

I claim:

1. A substantially homogeneous blend of polymeric materials comprising:
    (a) 20 to 80 percent, by weight, of a terpolymer having, as monomeric components,
        (i) 65 to 95 percent, by weight, ethylene,
        (ii) 4 to 30 percent, by weight, vinyl alkanoate or an ester selected from the group consisting of alkyl acrylate, and alkyl methacrylate wherein the alkanoic acid moiety of the alkanoate and the alkyl group have one to four carbon atoms, and
        (iii) 0.5 to 20 percent, by weight, ethylenically unsaturated monocarboxylic acid selected from the group consisting of acrylic acid and methacrylic acid; and
    (b) 20 to 80 percent, by weight, of an ionomer having, as monomeric components,
        (i) 75 to 99 percent, by weight, ethylene,
        (ii) 1 to 25 percent, by weight, ethylenically unsaturated monocarboxylic acid selected from the group consisting of acrylic acid and methacrylic acid wherein the sum of the weight percentages of comonomers (ii) and (iii) in the terpolymer is at least eight percentage points higher than the weight percentage of comonomer (ii) in the ionomer and wherein 5 to 40 percent of the carboxylic acid in the blend is neutralized by zinc ions.

2. The blend of claim 1 wherein the monomer, (ii), of the terpolymer is a vinyl alkanoate and the alkanoate is acetate.

3. The blend of claim 1 wherein the monomer, (ii), of the terpolymer is an alkyl acrylate and the alkyl group is isobutyl.

4. The blend of claim 1 wherein self-supported films of the blend material exhibit a peel seal (118 to 275 grams per centimeter) temperature range of at least 7 Celsius degrees.

5. The blend of claim 4 wherein self-supported films of the blend material exhibit a tear seal (275 grams per centimeter to tear) temperature range of at least 8 Celsius degrees.

* * * * *